United States Patent Office 3,715,354
Patented Feb. 6, 1973

---

3,715,354
OXOISOINDOLES
Karl Schoen, Kew Gardens, and Irwin J. Pachter, Woodbury, N.Y., assignors to Endo Laboratories Inc., Garden City, N.Y.
No Drawing. Continuation-in-part of application Ser. No. 664,942, Sept. 1, 1967. This application Oct. 4, 1968, Ser. No. 765,010
Int. Cl. C07d 87/38
U.S. Cl. 260—247.5 B                         8 Claims

ABSTRACT OF THE DISCLOSURE 5-aminomethyl- and 5-(substituted-amino)methyl-4,5,6,7-tetrahydrooxoisoindoles and the acid addition salts thereof are prepared by quaternizing 5-(dimethylamino)methyl- or 5-piperidinomethyl-4,5,6,7-tetrahydrooxoisoindoles, and reacting the quaternary salts either with a base and an amine, or alternatively, with an amine only. Compounds of the indicated types are useful as tranquilizers, antidepressants and analgetics.

CROSS-REFERENCE TO OTHER APPLICATIONS

This application is a continuation-in-part of our copending application Ser. No. 664,942, filed Sept. 1, 1967, now abandoned which is a continuation-in-part of our copending applications Ser. No. 575,303, filed Aug. 26, 1966, and Ser. No. 599,387, filed Dec. 6, 1966, both now abandoned. Certain of the compounds disclosed herein are described in our copending applications Ser. No. 403,387, filed Oct. 12, 1964, now U.S. Pat. No. 3,410,857, Ser. No. 357,284, filed Apr. 3, 1964, now abandoned and Ser. No. 686,777, filed Nov. 29, 1967, now Pat. No. 3,491,093 granted Jan. 20, 1970.

BACKGROUND OF THE INVENTION

(1) Field of the invention

This invention relates to a method of preparing compounds which are useful as transquilizers, antidepressants and analgetics.

(2) Description of the prior art

Various compounds within the following class are known and have been described, for example, in our above-noted copending applications.

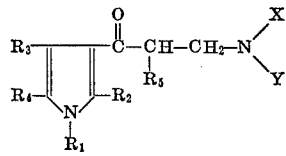

Formula A

In the above formula:

$R_1$ designates hydrogen, a lower alkyl group having a maximum of 6 carbon atoms, phenyl, phenyl-alkyl (where the alkyl group has up to 3 carbons), substituted phenyl or substituted phenyl-lower alkyl in which the substituent on the phenyl ring is halogen, lower alkyl, i.e., wherein the alkyl group has not more than 4 carbon atoms, lower alkoxy of not more than 4 carbon atoms, halogenated alkyl of not more than 4 carbon atoms, or 2-, 3- or 4-pyridyl;

$R_2$, $R_3$ and $R_4$ designate hydrogen, alkyl, alkenyl or cycloalkyl having a maximum of 8 carbon atoms, phenyl, halophenyl, (lower alkoxy)-phenyl, thienyl, furyl, or benzyl;

$R_3$ and $R_4$ may be linked to constitute an alicyclic ring having a maximum of 8 carbon atoms;

$R_5$ designates hydrogen, alkyl, alkenyl or cycloalkyl, all having a maximum of 8 carbon atoms, phenyl or benzyl; and $R_2$ or $R_3$ may be linked with $R_5$ to constitute alicyclic rings having a maximum of 8 carbon atoms, those rings formed by linking $R_2$ and $R_5$ optionally being substituted by alkyl groups having 1-4 carbon atoms and those rings formed by linking $R_3$ and $R_5$ optionally being substituted by an alkyl or alkylidene group having 1-4 carbon atoms, a benzylidene or a benzyl group.

X and Y are each the same or different and are hydrogen, lower alkyl, lower alkynyl, lower alkenyl, cycloalkyl, bicycloakyl, hydroxy-lower alkyl, alkoxy-lower alkyl, lower dialkylamino, lower acyloxyalkyl, carbamoyloxy-lower alkyl, phenyl-lower alkyl, heteroaromatic lower alkyl, heteroaryl and saturated heteroaryl, and wherein X and Y may be linked, and when linked constitute a heterocyclic ring of not more than eight members.

Some of the compounds embraced within the scope of general Formula A, as set forth above, have heretofore been prepared, or may be prepared, through the Mannich reaction of the corresponding pyrrol-3-yl ketone with formaldehyde or a formaldehyde-yielding substance, e.g., paraformaldehyde, and a base X—NH—Y as set forth in the following reaction scheme:

REACTION SCHEME I

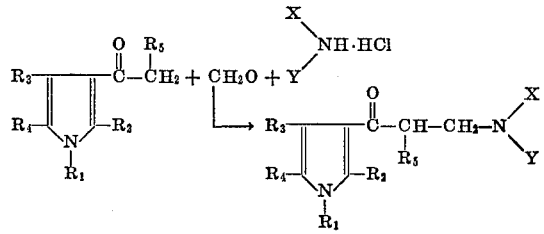

Resonance interaction of the electron-rich pyrrole ring with the ketone carbonyl in the pyrrole ketones renders these less reactive than structurally related aromatic ketones such as phenyl ketones and naphthyl ketones. One result of such lower reactivity is that the Mannich reaction proceeds very slowly with many of the important bases X—NH—Y or their corresponding salts. It has been found that side reactions occur during the prolonged reflux periods necessary for complete reaction; and frequently there are produced dark products which are difficult to purify.

Of the various Mannich reactions carried out, those with dimethylamine hydrochloride proceed most rapidly, with better yield and with higher purity. However, it has not been possible to produce primary or secondary aminoalkyl ketones by the method of Reaction Scheme I, that is to say, compounds of general formula A herein wherein the moieties X and Y may either or both be hydrogen.

SUMMARY OF THE INVENTION

We have now discovered that it is advantageous in the preparation of pure products of Formula A in high yield to use as starting materials compounds of the following formula:

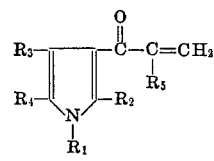

Formula B

Compounds of Formula B can be conveniently produced from quaternized salts of the dimethylamine Mannich bases of Formula A by splitting off therefrom, under alkaline conditions, the tertiary amine moiety.

Thus, it can be generalized that the dimethylamine Mannich bases can constitute the starting materials for the preparation of Mannich bases having a different amino function from that of starting compound A.

Illustrative of our process is the sequence of steps just mentioned and set forth below:

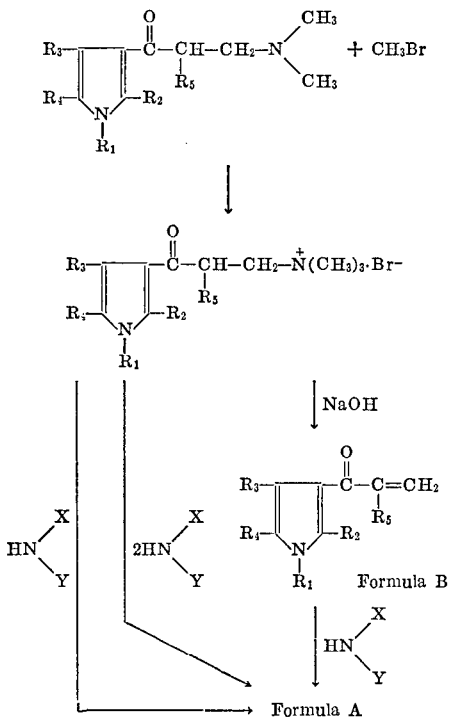

REACTION SCHEME II

The dimethylamine Mannich base is quaternized with an alkyl halide or sulfate, suitably a lower alkyl halide or sulfate such as methyl-, ethyl- or propyl-bromide, chloride, iodide, or sulfate, and the resulting quaternary salt treated with aqueous alkali, suitably aqueous sodium or potassium hydroxide, to produce the stable methylene derivative.

Upon interaction of the methylene compound with a new base there is produced a final product of good quality and in high yield.

The success of the process of this invention is a consequence of the unusual stability of the methylene compounds of the Formula B (in which the symbols $R_1$ to $R_5$ have the same meaning as in Formula A). The compounds of Formula B are more resistant to polymer-forming side reactions than are structurally comparable aryl derivatives such as the acrylophenones.

The compounds of the invention are 4,5,6,7-tetrahydrooxoisoindoles of Formula A wherein the moiety X and/or Y are hydrogen, which could not be satisfactorily prepared by the method of Reaction Scheme I. The present invention further includes compounds wherein X and/or Y are lower alkynyl, lower alkenyl, bicycloalkyl, alkoxy-lower alkyl, lower dialkylamino, heteroaromatic lower alkyl, heteroaryl and saturated heteroaryl.

The compounds of this invention within the scope of general Formula A are more specifically exemplified by the following structural formula:

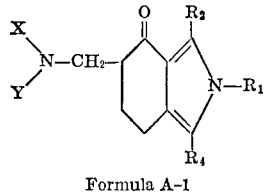

Formula A-1 wherein $R_1$, $R_2$ and $R_4$, X and Y have the same values as in general Formula A.

The present invention provides a convenient general method of synthesizing components containing a substituted 5-aminomethyl - 4,5,6,7 - tetrahydrooxoisoindole nucleus of Formula A-1.

THE PREFERRED EMBODIMENTS

In the preferred embodiments of the present invention, in the Formula A-1, $R_1$ designates hydrogen, a lower alkyl group such as methyl, ethyl, propyl, butyl or hexyl; phenyl, phenyl lower alkyl such as benzyl, phenethyl, or phenylbutyl; substituted phenyl or substituted phenylalkyl, wherein the substituent on the phenyl ring is chloro, bromo, or fluoro, alkyl of not more than 4 carbon atoms, alkoxy, for example, methoxy, ethoxy, propoxy, or butoxy; haloalkyl of not more than 4 carbon atoms, for example, bromomethyl, dichloroethyl, dichloropropyl, fluorochlorobutyl, or bromobutyl; or 2-, 3- or 4-pyridyl;

$R_2$ and $R_4$ designate alkyl, suitably lower alkyl such as methyl, propyl, butyl or hexyl; alkenyl, preferably lower alkenyl such as propenyl, butenyl, pentenyl, hexadienyl, and heptadienyl; or cycloalkyl, for example, cyclopropyl, cyclopentyl, cyclohexyl, or cyclooctyl; phenyl, halophenyl such as bromophenyl, chlorophenyl or fluorophenyl; lower alkoxy phenyl suitably methoxy-, propoxy- or butoxyphenyl; thienyl; furyl; or benzyl.

X and Y are each the same or different and may be hydrogen; lower alkynyl, such as propynyl, butynyl, and pentynyl; lower-alkenyl, such as allyl, butenyl, or hexenyl; lower alkyl such as methyl, ethyl, butyl, pentyl, hexyl, or heptyl; cycloalkyl, suitably lower cycloalkyl, such as cyclopropyl, cyclobutyl, cyclopentyl, cyclohexyl or cyclooctyl; hydroxy lower alkyl, such as hydroxyethyl; lower alkoxy-lower alkyl, such as ethoxyethyl; dialkylamino, suitably di(lower alkyl)amino, such as dimethylamino or saturated heterocyclic bases such as piperidino; lower acyloxy-alkyl, suitably lower-alkanoyloxy-lower alkyl; carbamoyloxy-lower alkyl; phenyl-lower alkyl; heterocyclo-lower alkyl; and wherein X and Y may be mutually linked; and when linked constitute a heterocyclic ring of not more than 8 members, suitably a 5- to 8-membered ring, containing between 1 and 3 hetero atoms of the group oxygen, nitrogen and sulphur of which at least one member shall be nitrogen.

It being understood that in the present disclosure unless otherwise specified, the partial designation "lower alk" shall signify an aliphatic residue of no more than 5 carbon atoms.

Examples of heterocyclic rings which X and Y may form are piperidino, (lower alkyl) piperidino, di(lower alkyl) piperidino, (lower alkoxy) piperidino, hydroxypiperidino, lower alkoxy-carbonylphenylpiperidino, phenylhydroxypiperidino, (lower alkanoyl) piperidino, pyrrolidinyl, (lower alkyl) pyrrolidinyl, (lower alkoxy) pyrrolidinyl, hydroxypyrrolidinyl, morpholino, (lower alkyl)morpholino, di(lower alkyl)morpholino, thiomorpholino, (lower alkyl) thiomorpholino, di(lower alkyl)-thiomorpholine, (lower alkoxy)thiomorpholino, piperazinyl, (lower alkyl) piperazinyl, di-(lower alkyl) piperazinyl, (lower alkoxy) piperazinyl, phenylpiperazinyl, chlorophenylpiperazinyl, tolylpiperazinyl, methoxyphenylpiperazinyl, hydroxyalkylpiperazinyl, lower alkanoyloxy-lower alkylpiperazinyl, carbamoyloxy-lower alkyl piperazinyl, pyridyl, pyrimidinyl, pyridazinyl, pyrazolyl, quinolyl, isoquinolyl, pyrrolyl, thienyl, furyl or oxazolyl and azabicycloalkyl. The terms "lower alkyl" and "lower alkoxy" refer to both straight and branched chain radicals of no more than 5 carbon atoms, such as methyl, ethyl, isopropyl, butyl and pentyl and methoxy, propoxy, isobutoxy and pentoxy.

The aforementioned heterocyclic moieties or unsaturated derivatives thereof may themselves be bonded to a lower alkyl group, or by a ring atom other than nitrogen to constitute a heterocyclo alkyl or heterocyclo moiety respectively designated by the symbol X or Y.

In the preferred modification of the process a dimethylamine Mannich base of general Formula A is utilized as the starting material for other Mannich bases of Formula A having a different amino function.

Although dimethylamine Mannich bases are most advantageous as starting materials for this process, other lower alkylamino Mannich bases as well as heterocyclic bases such as the piperidino Mannich base may also be used.

In the preferred procedure, the Mannich base, which is usually obtained in the form of an acid salt, suitably the hydrochloride, is treated with aqueous ammonia and the free Mannich base isolated from the aqueous mixture. In a suitable mode of isolation, the base is extracted from the reaction mixture with a low boiling, reaction inert, water-immiscible solvent, such as ethyl acetate, diethyl ether, or the like. Upon evaporation of the solvent, the base is taken up in a suitable organic solvent, preferably a polar organic solvent such as acetone, or isopropanol, and treated with the quaternizing agent. In the preferred modification, gaseous methyl bromide is used as the quaternizing agent, and is bubbled into the solution of the Mannich base until no further separation of the quaternary is noted. The quaternary salt is then isolated as a residue by filtration, and recrystallized, suitably from a lower alkanol such as methanol.

The quaternary salt has the general Formula C:

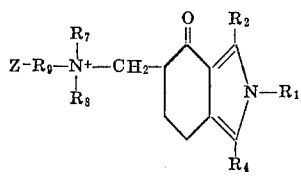

Where $R_1$, $R_2$ and $R_4$ are as above.

$R_9$, $R_7$ and $R_8$ are alkyl having from 1 to 8 carbon atoms; however, $R_9$ and $R_7$ may be joined to form a ring containing up to 7 carbon atoms, i.e., the piperidine, pyrrolidine and perhydro azepine nuclei;

Z is an inorganic radical such as chloride, bromide, sulfate, or the like.

The quaternary salt of the Mannich base, for example, the methobromide, the methiodide, the methosulfate, or the like, is dissolved in water and treated with an excess of an alkali such as aqueous sodium hydroxide, ammonia, or a strong organic base such as triethylamine. The desired vinyl compound of general Formula B separates as a precipitate, and is isolated. The vinyl compound of general Formula B is then purified, preferably by recrystallization from the suitable solvents such as a lower alkanol, preferably ethanol.

The vinyl compounds of general Formula B are then reacted with amines of the general formula X—NH—Y, wherein X and Y have the significance set forth hereinabove, and may thus represent primary amines or secondary cyclic or acyclic amines.

The reaction of the amine with the compound of Formula B may be carried out in a number of modifications. The preferred mode will depend upon the reactivity and volatility of the respective reactants. Many primary and secondary amines will react with compounds of Formula B at ambient temperature, that is to say, from about 10° C. to about 30° C. with evolution of heat where the reaction is carried out in a solvent such as a lower alkanol, for example, methanol, ethanol, propanol, butanol, and the like, or in di-lower alkyl ketones, for example, acetone, methylethyl ketone, di-isopropyl ketone, and the like, as well as in lower alkyl lower alkanoates such as ethyl acetate, propyl acetae and butyl propionate.

Where desired, the reaction may be carried out in similar solvents under reflux at temperatures of from about 50° to about 150° C. Where it is desired to use low boiling solvents, particularly with volatile amines, the reaction may be advantageously carried out in pressure vessels at temperatures up to about 150° C. In yet another modification of the procedure, it is sometimes advantageous to use excess of the amine base itself as the solvent.

Reaction time varies from one minute to 24 hours, depending upon the nature of the reactants. Most reactions proceed to completion in less than 8 hours.

Among the amines which may be employed in the process of the present invention which may be primary or secondary, may be included those bearing alkyl groups, suitably lower-alkyl groups, such as methyl, ethyl, propyl, and butyl; cycloalkyl groups, such as cyclopropyl and cyclohexyl; alkenyl groups, suitably lower-alkenyl groups, such as allyl, methallyl and hexenyl; alkynyl groups, suitably lower alkynyl groups, such as propynyl, butynyl, and hexynyl groups; or phenyl-alkyl groups, suitably phenyl-lower alkyl groups such as benzyl, phenylethyl, and phenylbutyl groups; alkoxy-alkyl groups, suitably lower alkoxy-lower alkyl groups, such as methoxyethyl, ethoxyethyl, butoxyethyl, pentoxypropyl; hydroxyalkyl groups, suitably hydroxy-lower alkyl groups, such as hydroxyethyl, hydroxypropyl, hydroxybutyl, or hydroxyhexyl; dialkylamino, such as dimethylamino.

Also included within the scope of the amines used in this process are heterocyclic secondary amines, wherein the secondary amino function is part of the cyclic moiety which may, if desired, itself be substituted. Preferred among these compounds are five or six membered heterocyclic amines containing at least one nitrogen-atom in the ring, and from zero to two other heteroatoms of the group oxygen, nitrogen and sulfur such as piperidino, (lower alkyl) piperidino, di(lower alkyl) piperidino, (lower alkoxy) piperidino, hydroxypiperidino, lower alkoxycarbonylphenylpiperidino, phenylhydroxypiperidino, (lower alkanoyl) piperidino, pyrrolidinyl, (lower alkyl) pyrrolidinyl, (lower alkoxy) pyrrolidinyl, hydroxypyrrolidinyl, morpholino, (lower alkyl) morpholino, di-(lower alkyl) morpholino, thiomorpholino (lower alkyl) thiomorpholino, di(lower alkyl) thiomorpholino, (lower alkoxy) thiomorpholino, piperazinyl, (lower alkyl) piperazinyl, di-(lower alkyl) piperazinyl, (lower alkoxy) piperazinyl, phenylpiperazinyl, chlorophenylpiperazinyl, tolylpiperazinyl, methoxyphenylpiperazinyl, hydroxyalkylpiperazinyl, lower alkanoloxy-lower alkylpiperazinyl and carbamoyloxy-lower alkyl piperazinyl, and azabicycloalkyl such as 3-azaspiro [5.5] undecanyl and 3-azabicyclo [3.2.2] nonyl. The terms "lower alkyl" and "lower alkoxy" refer to both straight and branched chain radicals of no more than 5 carbon atoms.

Furthermore, there are included primary and secondary amines wherein one of the substituents of the amino moiety corresponds to a radical derived from any of the aforementioned heterocyclic groups, for example, morpholino, pyrrolidinyl, thiomorpholino, piperazinyl, as well as the unsaturated derivatives thereof, for example, picolyl, tetrazolyl, pyrazinyl and the like.

In another modification of the process, the quaternary salt (Formula C) derived from the starting material Mannich base of Formula A may be converted into the desired end product without the isolation of the intermediate methylene compound of Formula B. In this modification as set forth in Reaction Scheme II, the new organic base, i.e., the amine, may serve as both the source of alkali and as the reactant.

The [(dimethylamino)methyl]oxoisoindoles of this invention are readily prepared by the process of Reaction Scheme I, starting with an oxoisoindole.

Other aminomethyloxoisoindoles are most satisfactorily derived from the corresponding [(dimethylamino)methyl] oxoisoindoles by the general method of Reaction Scheme II, although many products which are tertiary amines may also be prepared by the process of Reaction Scheme I.

PHARMACOLOGICAL ACTIVITY

The compounds of the foregoing Formula A-1 have central nervous system activity; and are particularly useful as tranquilizers, ataractics, and sedatives. They are also useful as analgetics and antidepressants.

It is to be understood however that the degree of such activity will vary between the compounds disclosed. The preferred dosage and the mode of administration may similarly be varied.

The compounds can be put up in customary pharmaceutical composition forms such as tablets, capsules, syrups, suppositories, etc., in accordance with the techniques of pharmaceutical compounding employing appropriate carrier or vehicular materials as excipients, etc.

The active compounds of this invention may be taken in tablets or capsules in doses of 1-100 mg., in syrup at 0.5-20 mg./ml. concentration, in 1-50 mg. suppositories or by parenteral injection in 0.5-50 mg./ml. concentration.

The compounds may be administered at dosage levels of about 0.07-3 mg./kg., preferably between 0.7/1.8 mg./kg. daily. A compound prepared by the process of this invention showed marked antipsychotic activity in humans when administered at the preferrel level—i.e., 50-125 mg. per patient daily. Chronic schizophrenic male patients showed improvement in disorientation, thinking and perceptual distortion as well as in schizophrenic disorganization and social competence.

Among the tests carried out to determine the pharmacological activity of certain compounds disclosed in the present application are the following:

(a) The locomotor activity test
(b) The rotorod behavior test
(c) Amphetamine antagonism test
(d) Conditioned avoidance response test
(e) Exploratory behavior test These tests were carried out on the following compounds identified below; the compounds are cross-referenced to the ensuing examples in which their synthesis is described, and the test methods utilized and results obtained are set forth in detail thereafter.

| Abbreviation | Full name |
| --- | --- |
| TDPO (Ex. 3) | 4,5,6,7-tetrahydro-1,3-dimethyl-5-piperidino methyl-4-oxoisoindole hydrochloride. |
| TDDO (Ex. 1.1) | 4,5,6,7-tetrahydro-1,3-dimethyl-5-dimethyl-aminomethyl-4-oxoisoindole hydrochloride. |
| TDMO (Ex. 7.2) | 4,5,6,7-tetrahydro-1,3-dimethyl-5-morpholino-methyl-4-oxoisoindole hydrochloride. |
| TDPPO (Ex. 7.1) | 4,5,6,7-tetrahydro-1,3-dimethyl-5-(4-phenyl-piperazinyl)methyl-4-oxoisoindole. |
| TTDO (Ex. 4.1) | 4,5,6,7-tetrahydro-1,2,3-trimethyl-5-dimethyl-aminomethyl-4-oxoisoindole hydrochloride. |
| TTMO (Ex. 6) | 4,5,6,7-tetrahydro-1,2,3-trimethyl-5-morpholino-methyl-4-oxoisoindole hydrochloride. |
| TDCHO (Ex. 7.3) | 4,5,6,7-tetrahydro-1,3-dimethyl-5-cyclohexyl-aminomethyl-4-oxoisoindole hydrochloride. |
| TDPYO (Ex. 7.6) | 4,5,6,7-tetrahydro-1,3-dimethyl-5-pyrolidinyl-methyl-4-oxoisoindole. |
| TDCPO (Ex. 7.5) | 4,5,6,7-tetrahydro-1,3-dimethyl-5-cyclopropyl-aminomethyl-4-oxoisoindole hydrochloride. |

THE MOUSE TESTS

Mouse locomotor activity.—Photocell-activated cages were used to record the locomotor activity of groups of 5 mice given the test compounds orally. Mice were placed in the actophotometers 30 minutes after drug administration and locomotor activity was recorded for 1 hour. Four dose levels and 15 animals per dose were used for the calculation of the $ED_{50}$, i.e., the dose causing a 50% decrease in activity from saline controls.

Rotorod behavior.—This test measured the ability of mice to remain on a slowly rotating rod for 1 minute. Groups of 10 mice were given the test compounds orally and then placed on the rod after 30, 60, and 120 minutes. Four dose levels and 10 mice per dose were used for the calculation of the $ED_{50}$, i.e. the dose causing 50% of the mice to fall off the rod within one minute.

Amphetamine antagonism.—This test measured the ability of the iso-oxoindoles to antagonize the increased locomotor activity produced by the subcutaneous administration of 5 mg./kg. d-amphetamine. The amphetamine was administered to groups of 5 mice 1 hour after the oral administration of the test compound. Changes in locomotor activity were measured in actophotometers. Four dose levels and 15 mice per dose were used for the calculation of the $ED_{50}$, i.e., the dose causing a 50% decrease in activity from amphetamine controls.

These results are summarized and set forth in Table I below:

TABLE I.—EFFECT OF ISO-OXOINDOLES IN SOME MOUSE SCREENS

| Compound | Mouse LMA (a) | $ED_{50}$, mg./kg. Rotorod (b) | $ED_{50}$, mg./kg. p.o., mouse anti-amphetamine (c) | Mouse $LD_{50}$, mg./kg. p.o. |
| --- | --- | --- | --- | --- |
| TDPO | 3.5 | 4.1 | 7.6 | 200 |
| TDDO | 2.6 | 4.1 | 1.7 | 200 |
| TDMO | 5.5 | 4.1 | 16.9 | 350 |
| TDPPO | 4.8 | 1.0 | 5.8 | 200 |
| TDPYO | 7.1 | 4.8 | | 100 |
| TDCPO | 1.0 | | | 100 |
| TTDO | 3.0 | | 5.0 | 150 |
| TDCHO | 3.0 | 5.4 | | 100 |
| TTMO | 3.0 | | | 150 |
| Chlorpromazine | 3.9 | 2.6 | 2.0 | |

THE RAT TESTS

Rat conditioned avoidance response.—Rats were trained to jump out of a pit onto a ledge to avoid shock when presented with a light and sound conditioned stimulus. The animals were tested 1, 2, and 4 hours after administration of the test compound. Four dose levels and 8 rats per dose were used for the calculation of the $ED_{50}$, i.e. the dose causing a block of the conditioned response in 50% of the rats.

Rat exploratory behavior.—The immediate exploratory response of rats to a new environment was measured by recording the time required for an animal to pass from one chamber to an adjacent one in the test apparatus. All animals were given a maximum of 1 minute to perform this locomotor activity. Rats were tested 1 and 2 hours after oral administration of a test compound. Four dose levels and 10 rats per dose were used for the calculation of the $ED_{50}$, i.e., the dose causing 50% of the test animals to take more than 1 minute for passing into the second chamber.

These tests are summarized and set forth in Table II below:

TABLE II.—EFFECT OF ISO-OXOINDOLES IN SOME RAT SCREENS

| Compound | $ED_{50}$, mg./kg. p.o., rat CAR (d) | Rat exploratory (e) |
| --- | --- | --- |
| TDPO | 6.2 | 1.9 |
| TDDO | 22.0 | 2.7 |
| TDMO | 5.1 | 1.7 |
| TDPPO | 13.0 | 1.0 |
| TTDO | 15.0 | |
| TDPYO | 10.0 | |
| Chlorpromazine | 6.5 | 4.3 |

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The temperatures in the following examples are in degrees centigrade.

EXAMPLE 1

4,5,6,7-tetrahydro-1,3-dimethyl-5-dimethyl-aminomethyl-4-oxoisoindole 2,5-dimethylpyrrole was subjected to the action of succinic anhydride and boron trifluoride etherate in benzene solution to produce 4-(2,5-dimethyl-3-pyrryl) - 4 - oxobutyric acid, M.P. 154–156° which was, in turn, reduced with hydrazine and alcoholic potassium hydroxide at 190° to 4-(2,5-dimethyl-3-pyrryl) butyric acid. The reduced acid was not purified, but was cyclized directly with polyphosphoric acid to produce 4,5,6,7-tetrahydro-1,3-dimethyl-4-oxoisoindole, M.P. 150.5–151.5°. The latter was allowed to react with dimethylamine hydrochloride and paraformaldehyde in refluxing ethanol to yield (1.1) 4,5,6,7 - tetrahydro-1,3-dimethyl - 5 - dimethylaminomethyl-4-oxoisoindole hydrochloride, M.P. 188–189.5°.

In accordance with the above procedure, but using 2,5-diethylpyrrole, 2-methyl - 5 - p-chlorophenyl pyrrole, 2-methyl-5-p-tolyl pyrrole, 2-methyl - 5 - p-methoxyphenyl pyrrole and 2-methyl-5-phenyl pyrrole in place of 2,5-dimethyl pyrrole, there are obtained (1.2) 4,5,6,7-tetrahydro-1,3-diethyl-5-dimethylaminomethyl-4-oxoisoindole hydrochloride,
(1.3) 4,5,6,7-tetrahydro-1-methyl-3-p-chlorophenyl-5-dimethylaminomethyl-4-oxoisoindole hydrochloride,
(1.4) 4,5,6,7-tetrahydro-1-methyl-3-p-tolyl[phenyl]-5-dimethylaminomethyl-4-oxoisoindole hydrochloride,
(1.5) 4,5,6,7-tetrahydro-1-methyl-3-p-methoxyphenyl-5-dimethylaminomethyl-4-oxoisoindole hydrochloride,
(1.6) 4,5,6,7-tetrahydro-1-methyl-3-phenyl-5-dimethylaminomethyl-4-oxoisoindole hydrochloride, M.P. 225–227°.

EXAMPLE 2

4,5,6,7-tetrahydro-1,3-dimethyl-5-methylene-4-oxoisoindole 4,5,6,7 - tetrahydro-1,3-dimethyl - 5 - dimethylaminomethyl-4-oxoisoindole hydrochloride was dissolved in water and treated with aqueous sodium hydroxide to produce the base, M.P. 169–170°. The base was dissolved in acetone and converted with methyl bromide into the methobromide salt, M.P. 236–238°. When the latter was dissolved in water and made basic with aqueous sodium hydroxide, the yellow 4,5,6,7-tetrahydro-1,3-dimethyl-5-methylene-4-oxoisoindole was obtained.

EXAMPLE 3

4,5,6,7-tetrahydro-1,3-dimethyl-5-piperidinomethyl-4-oxoisoindole hydrochloride

In accordance with the procedure of Example 1.1, but using piperidine hydrochloride in place of dimethylamine hydrochloride, there is obtained the corresponding 4,5,6,7 - tetrahydro-1,3-dimethyl-5-piperidinomethyl - 4 - oxoisoindole hydrochloride, M.P. 188–189° C.

A sample of the hydrochloride salt was converted to the base with aqueous alkali, upon recrystallization from aqueous methanol, the base had a M.P. of 145–146° C.

EXAMPLE 4

4,5,6,7-tetrahydro-1,2,3-trimethyl-5-dimethylaminomethyl-4-oxoisoindole hydrochloride 1,2,5-trimethylpyrrole was subjected to the action of succinic anhydride and boron trifluoride etherate in benzene solution to produce 4-(1,2,5-trimethyl-3-pyrryl)-4-oxobutyric acid M.P. 162.5–163.5°, which was in turn reduced with hydrazine hydrate and potassium hydroxide at 190° to 4-(1,2,5-trimethyl-3-pyrryl) butyric acid. The reduced acid was not purified, but was cyclized directly with polyphosphoric acid to produce 4,5,6,7-tetrahydro-1,2,3-trimethyl-4-oxoisoindole, M.P. 82–83°. The latter was allowed to react with dimethylamine hydrochloride and paraformaldehyde in refluxing ethanol to yield (4.1) 4,5,6,7-tetrahydro - 1,2,3 - trimethyl - 5 - dimethylaminomethyl-4-oxoisoindole hydrochloride, M.P. 195–196°.

In accordance with the above procedure but starting with 1-benzyl - 2,5 - dimethylpyrrole in place of 1,2,5-trimethyl pyrrole there is obtained 2-benzyl-4,5,6,7-tetrahydro-1,3-dimethyl-5-dimethylaminomethyl - 4 - oxoisoindole hydrochloride, (4.2).

EXAMPLE 5

4,5,6,7-tetrahydro-1,2,3-trimethyl-5-methylene-4-oxoisoindole 4,5,6,7-tetrahydro-1,2,3-trimethyl - 5 - dimethylaminomethyloxoisoindole hydrochloride was dissolved in water and treated with aqueous sodium hydroxide to produce the oily free base. The base was dissolved in acetone and converted into the methobromide salt, M.P. 197–200°, with methyl bromide. The methobromide salt, on treatment with aqueous sodium hydroxide, afforded the yellow 4,5,6,7 - tetrahydro-1,2,3-trimethyl-5-methylene - 4 - oxoisoindole, M.P. 103–104°.

EXAMPLE 6

4,5,6,7-tetrahydro-1,2,3-trimethyl-5-morpholinomethyl-4-oxoisoindole hydrochloride A mixture of 5.5 g. of 4,5,6,7-tetrahydro-1,2,3-trimethyl-5-methylene-4-oxoisoindole and 25 ml. of morpholine was heated under reflux for 24 hours. Excess morpholine was removed and the residue, upon dilution with water, solidified. The solid was collected and melted at 97–98.5 upon recrystallization from cyclohexane-benzene. The product was converted into its hydrochloride salt, (6.1) 4,5,6,7-tetrahydro - 1,2,3 - trimethyl-5-morpholinomethyl-4-oxoisoindole hydrochloride, M.P. 213–214°.

EXAMPLE 7

4,5,6,7-tetrahydro-1,3-dimethyl-4-oxo-5-(4-phenylpiperazinylmethyl)isoindole

A mixture of 6.0 g. of 4,5,6,7-tetrahydro-1,3-dimethyl-5-methylene-4-oxoisoindole, 6.0 g. of N-phenylpiperazine and 50 ml. of ethanol was heated under reflux for 20 hours. Upon evaporation of the ethanol and dilution with ether, the product crystallized to yield (7.1) 4,5,6,7-tetrahydro-1,3-dimethyl-4-oxo-5-(4 - phenylpiperazinylmethyl) isoindole, M.P. 184–185.5° after recrystallization from methanol.

In similar fashion, but using instead of the N-phenylpiperazine an equimolar amount of:

morpholine
cyclohexylamine
butylamine
cyclopropylamine
pyrrolidine
dibutylamine
isopropylamine
allylamine
2-propynylamine
2,6-dimethylmorpholine
thiomorpholine
benzylamine
2,6-dimethylpiperazine
2-aminoethanol
2-ethoxyethylamine
4-piperidinol
ethyl 4-phenylisonipecotate (ethyl 4-phenylpiperidine-4-carboxylate)
2,2-dimethylpiperidine
3-ethylpiperidine
1-(o-chlorophenyl)piperazine
1-(p-methoxyphenyl)piperazine
1-(m-tolyl)piperazine
1-piperazineethanol
2,6-dimethylthiomorpholine there is obtained:

(7.2) 4,5,6,7-tetrahydro-1,3-dimethyl-5-morpholinomethyl-4-oxoisoindole, M.P. 148–149° (hydrochloride, M.P. 172–174°)
(7.3) 4,5,6,7-tetrahydro-1,3-dimethyl-5-cyclohexylaminomethyl-4-oxoisoindole, M.P. 127–128°
(7.4) 4,5,6,7-tetrahydro-1,3-dimethyl-5-butylaminomethyl-4-oxoisoindole (7.5) 4,5,6,7-tetrahydro-1,3-dimethyl-5-cyclopropyl-aminomethyl-4-oxoisoindole, M.P. 192°
(7.6) 4,5,6,7-tetrahydro-1,3-dimethyl-5-pyrrolidinyl-methyl-4-oxoisoindole, M.P. 134–135°
(7.7) 4,5,6,7-tetrahydro-1,3-dimethyl-5-dibutylamino-methyl-4-oxoisoindole
(7.8) 4,5,6,7-tetrahydro-1,3-dimethyl-5-isopropylamino-methyl-4-oxoisoindole
(7.9) 4,5,6,7-tetrahydro-1,3-dimethyl-5-allylamino-methyl-4-oxoisoindole
(7.10) 4,5,6,7-tetrahydro-1,3-dimethyl-5-(2-propynyl-amino)methyl-4-oxoisoindole
(7.11) 4,5,6,7-tetrahydro-1,3-dimethyl-5-(2,6-dimethyl-morpholino)methyl-4-oxoisoindole
(7.12) 4,5,6,7-tetrahydro-1,3-dimethyl-5-thiomorpholino-methyl-4-oxoisoindole
(7.13) 4,5,6,7-tetrahydro-1,3-dimethyl-5-benzylamino-methyl-4-oxoisoindole
(7.14) 4,5,6,7-tetrahydro-1,3-dimethyl-5-(3,5-dimethyl-piperazinyl) methyl-4-oxoisoindole
(7.15) 4,5,6,7-tetrahydro-1,3-dimethyl-5-(2-hydroxy-ethylamino) methyl-4-oxoisoindole
(7.16) 4,5,6,7-tetrahydro-1,3-dimethyl-5-(2-ethoxyethyl-amino) methyl-4-oxoisoindole
(7.17) 4,5,6,7-tetrahydro-1,3-dimethyl-5-(4-hydroxy-piperidino) methyl-4-oxoisoindole
(7.18) 4,5,6,7-tetrahydro-1,3-dimethyl-5-(4-ethoxycar-bonyl-4-phenyl-piperidino) methyl-4-oxoisoindole
(7.19) 4,5,6,7-tetrahydro-1,3-dimethyl-5-(2,2-dimethyl-piperidino) methyl-4-oxoisoindole
(7.20) 4,5,6,7-tetrahydro-1,3-dimethyl-5-(3-ethylpiperi-dino) methyl-4-oxoisoindole
(7.21) 4,5,6,7-tetrahydro-1,3-dimethyl-5-[4-(o-chloro-phenyl) piperazinyl]-methyl-4-oxoisoindole
(7.22) 4,5,6,7-tetrahydro-1,3-dimethyl-5-[4-(p-methoxy-phenyl) piperazinyl] methyl-4-oxoisoindole
(7.23) 4,5,6,7-tetrahydro-1,3-dimethyl-5-[4-(m-tolyl) piperazinyl] methyl-4-oxoisoindole
(7.24) 4,5,6,7-tetrahydro-1,3-dimethyl-5-[4-(2-hydroxy-ethyl) piperazinyl] methyl-4-oxoisoindole
(7.25) 4,5,6,7-tetrahydro-1,3-dimethyl-5-(2,6-dimethyl-thiomorpholino)-methyl-4-oxoisoindole

EXAMPLE 8

Ingredients: Mg./tablet
4,5,6,7-tetrahydro-1,3-dimethyl - 5 - dimethyl-aminoethyl-4-oxoisoindole hydrochloride --- 10
Lactose USP (spray dried) ---------------- 170
Starch USP ------------------------------ 10
Magnesium stearate USP ------------------ 1
Flavor ---------------------------------- Q.s.

All above ingredients were passed through a 60-mesh sieve, blended for 30 minutes and compressed directly into tablets on a suitable tablet press at a weight of 191 mg., using a 11/32" biconcave scored punch.

EXAMPLE 9

Ingredients: Mg./suppository
4,5,6,7 - tetrahydro-1,3-dimethyl-5-morpholino-methyl-4-oxoisoindole hydrochloride ------ 100
Cocoa butter ---------------------------- Q.s.

The drug and cocoa butter are combined, mixed thoroughly and formed into 2-gram suppositories.

EXAMPLE 10

Ingredients: Mg./capsule
4,5,6,7 - tetrahydro-1,3-dimethyl-4-oxo-5-piperi-dinomethylisoindole hydrochloride -------- 20
Lactose USP ----------------------------- 100
Magnesium stearate ---------------------- 1
Amorphous silicon dioxide (Cab-O-Sil) ----- 5

These ingredients were combined, blended and passed through a No. 1 screen of Fitzpatrick comminutor machine before encapsulating into a two-piece hard gelatin No. 3 capsule on a standard capsulating machine at a net weight of 126 mg.

EXAMPLE 11

Ingredients: Grams/liter
4,5,6,7 - tetrahydro-1-methyl-5-dimethylamino-methyl-4-oxo - 3 - phenylisoindole hydrochlo-ride ------------------------------------- 10
Granulated sugar ------------------------ 600
Flavor ---------------------------------- Q.s.
Color ----------------------------------- Q.s.
Sodium benzoate ------------------------- 1
Deionized water ------------------------- Q.s.

All above ingredients are dissolved in water, combined and made up to a volume of one liter.

EXAMPLE 12

Ingredients: Mg./ml.
4,5,6,7 - tetrahydro-1,2,3-trimethyl-5-dimethyl-aminomethyl - 4 - oxoisoindole hydrochlo-ride ------------------------------------- 5
Sodium chloride (for isotonicity) ---------- Q.s.
Methylparaben USP ---------------------- 1.8
Propylparaben USP ---------------------- 0.2
Water ----------------------------------- Q.s.

The above ingredients are combined in sterile solution for parenteral use.

What is claimed is:
1. A compound of the formula

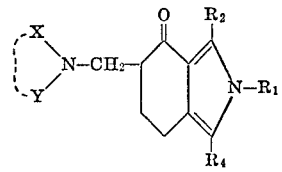

wherein
$R_1$, $R_2$ and $R_4$ are hydrogen, alkyl having a maximum of 6 carbon atoms, phenyl, phenyl-alkyl, the alkyl group of which has a maximum of 3 carbon atoms; and
X and Y are each the same or different and are hydrogen, lower alkyl, lower alkynyl, lower alkenyl, cycloalkyl, or phenyl-lower alkyl; or
X and Y, together with the nitrogen atom to which they are attached, define a heterocycle selected from the group consisting of piperidino, 4-phenylpiperidino, 4-hydroxy-4-phenylpiperidino, pyrrolidinyl, morpholino, thiomorpholino, phenylpiperazinyl, and (hydroxy-alkyl)piperazinyl, wherein "lower alkoxy" has 1–5 carbon atoms; or
the pharmaceutically acceptable acid addition salts thereof.

2. A compound of claim 1, where $R_1$, $R_2$ and $R_4$ are hydrogen, alkyl having a maximum of 6 carbon atoms, or phenyl, and X and Y are each the same or different and are hydrogen, lower alkyl having 1–4 carbon atoms, lower alkynyl having 3 carbon atoms, or cycloalkyl having 3–6 carbon atoms; or, together with the nitrogen atom to which they are attached, are piperidino, pyrrolidinyl, morpholino, thiomorpholino, or phenylpiperazinyl.

3. 4,5,6,7-tetrahydro - 1,3 - dimethyl-5-dimethylamino-methyl-4-oxoisoindole and the pharmaceutically acceptable acid addition salts thereof.

4. 4,5,6,7-tetrahydro - 1,3 - dimethyl-5-morpholino-methyl-4-oxoisoindole and the pharmaceutically acceptable acid salts thereof.

5. 4,5,6,7-tetrahydro - 1,3 - dimethyl-5-(4-phenylpiperazinyl)methyl-4-oxoisoindole and the pharmaceutically acceptable acid addition salts thereof.

6. 4,5,6 - tetrahydro - 1,2,3 - trimethyl-5-morpholinomethyl-4-oxoisoindole and the pharmaceutically acceptable acid addition salts thereof.

7. 4,5,6,7 - tetrahydro - 1,3 - dimethyl-5-cyclopropylaminomethyl-4-oxoisoindole and the pharmaceutically acceptable acid addition salt thereof.

8. 4,5,6,7 - tetrahydro - 1 - methyl-3-phenyl-5-dimethylaminoethyl-4-oxoisoindole and the pharmaceutically acceptable acid addition salts thereof.

No references cited.

ALEX MAZEL, Primary Examiner

J. H. TURNIPSEED, Assistant Examiner

U.S. Cl. X.R.

260—243 B, 268, 287 R, 288 R, 294, 307 R, 307 H, 326.1; 424—248

UNITED STATES PATENT OFFICE
CERTIFICATE OF CORRECTION

Patent No. 3,715,354  Dated February 6, 1973

Inventor(s) Karl Schoen et al

It is certified that error appears in the above-identified patent and that said Letters Patent are hereby corrected as shown below:

Column 4, line 11, for "phenyl, phenyl lower" read -- phenyl, phenyl-lower --; line 33, for "hydroxy lower alkyl," read -- hydroxy-lower alkyl, --; line 51, for "alkyl piperidino" read -- alkyl) piperidino --. Column 5, Formula C, separate $Z^-$ from $R_9-\overset{+}{N}$ ; line 73, for "acetae" read -- acetate --; Column 6, line 41, for "thiomorpholino" read -- thiomorpholino,-- line 47, for "lower alkanoloxy-lower" read -- lower alkanoyloxy-lower --. Column 7, line 20, for "0.7/1.8" read -- 0.7-1.8 --; line 23, for "preferrel" read -- preferred --. Column 9, line 21, for "3-p-tolyl[phenyl]-" read -- 3-p-tolyl- --. Column 11, line 34, for "piperazinyl]-methyl" read -- piperazinyl]methyl --; line 60, for "100" read -- 100 m.g. --. Column 12, line 24, for "Sodium chloride (for isotonicity)------------------Q.s." read -- Sodium chloride --------------------Q.s. for isotonicity --; line 52, for "piperidino, 4-phenylpiperidino" read -- piperidino, 4-[(lower alkoxy)carbonyl]-4-phenyl-piperidino --; line 72, for "acid salts thereof." read -- acid addition salts thereof. --. Column 13, line 1, for "4,5,6 -" read -- 4,5,6,7 - --; line 6, for "salt" read -- salts --.

Signed and sealed this 7th day of May 1974.

(SEAL)
Attest:

EDWARD M.FLETCHER,JR.  C. MARSHALL DANN
Attesting Officer  Commissioner of Patents